Oct. 25, 1938.  H. P. PHILLIPS  2,134,262

INTERNAL GAUGE FOR CYLINDERS AND THE LIKE

Filed March 2, 1936

INVENTOR
Harold P. Phillips
BY
Chappell, Earl R Chappell
ATTORNEYS

Patented Oct. 25, 1938

2,134,262

UNITED STATES PATENT OFFICE 2,134,262

INTERNAL GAUGE FOR CYLINDERS AND THE LIKE

Harold P. Phillips, Hastings, Mich., assignor to Hastings Manufacturing Company, Hastings, Mich.

Application March 2, 1936, Serial No. 66,689

7 Claims. (Cl. 33—178)

The main objects of this invention are:

First, to provide an internal gauge well adapted for use in determining and indicating the extent of wear, if any, in an automobile or other cylinder or cylindrical object.

Second, to provide a gauge of the type described which is simple in construction, yet accurate in operation.

Third, to provide a gauge having these advantages in the use of which an unskilled person can determine that a cylinder is worn and approximately the extent of wear and the location of the worn or tapered part thereof.

Fourth, to provide a gauge having means associated therewith for visually indicating variations in the diameter and shape of the cylinder.

Objects pertaining to details and economies of the invention will definitely appear from the description to follow. The invention is defined and pointed out in the claims.

A structure which embodies the features of the invention is clearly illustrated in the accompanying drawing in which.

Figure 1:
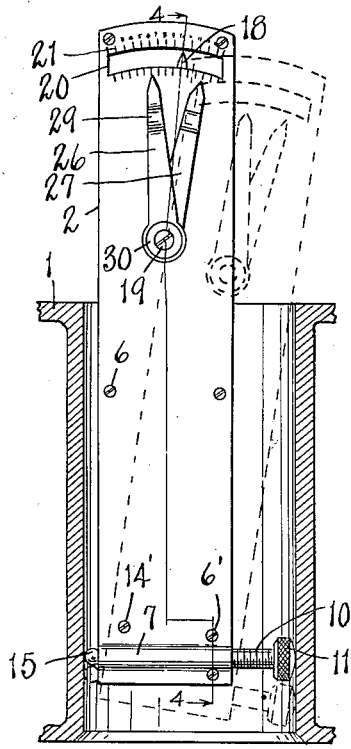
Fig. 1 is a fragmentary sectional view of a conventionally illustrated engine cylinder with my gauge in operative relation therein, certain manipulations of the gauge being indicated by dotted lines.
Figure 3:
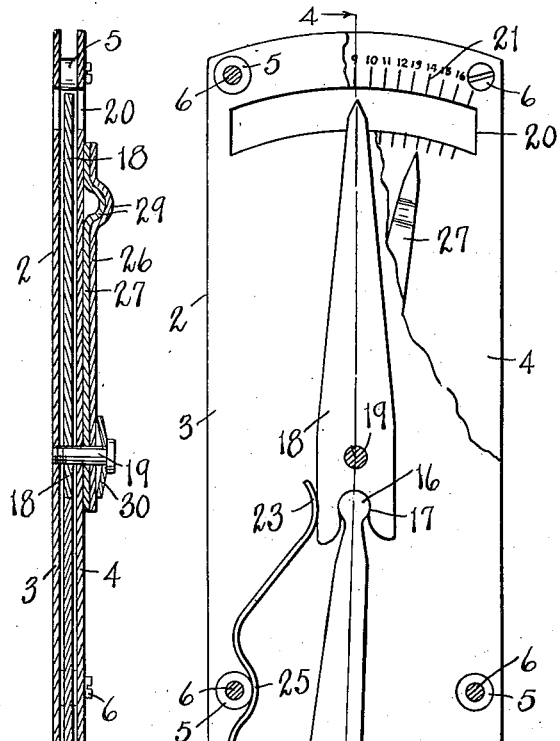
Fig. 3 is an enlarged front view of my device with the front housing or frame plate mainly broken away, the connecting screws and pivots being sectioned.
Figure 2:
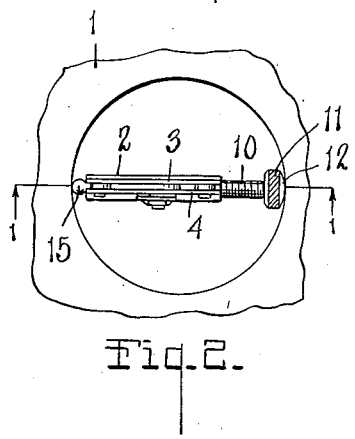
Fig. 2 is a fragmentary plan view of the parts shown in Fig. 1.
Figure 4:
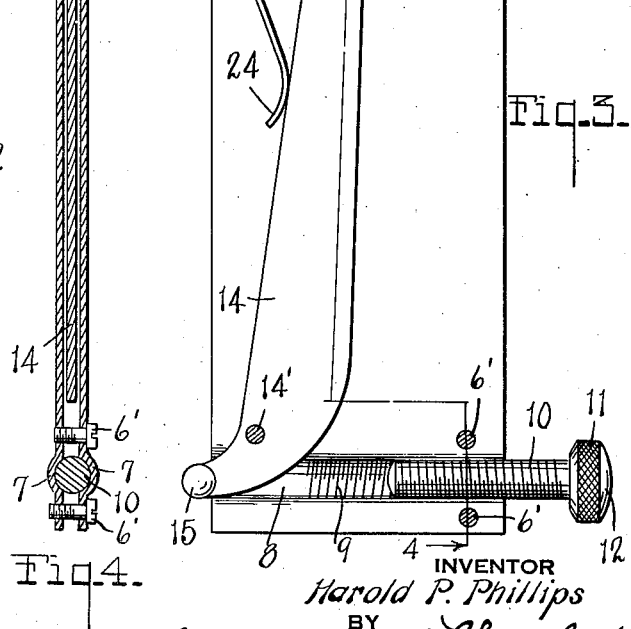
Fig. 4 is a sectional longitudinal section on line 4—4 of Fig. 1, parts being shown in full lines for convenience in illustration.

Various means and devices have heretofore been resorted to in garages, automobile repair shops and the like, for determining the condition of the cylinder in a used engine, both in the matter of determining the out of round condition thereof and the taper in certain portions which commonly wear tapered in use. These devices, so far as my knowledge goes, have been rather cumbersome and expensive and require great skill and care in use, frequently with unsatisfactory results. Further, with such devices it is not easy to show to the customer the exact condition of his engine cylinders. I have provided a device which is very simple in operation but at the same time is positive and accurate and is provided with means or indicating fingers which may be set to indicate maximum or minimum readings or other readings, so that not only the user of the instrument but the owner of the automobile may readily determine the condition of the cylinder.

In the embodiment of my invention illustrated I indicates a conventional cylinder of an engine. My improved gauge is designated generally by the numeral 2 and consists of a frame or housing made up of a pair of side plates 3 and 4 held in spaced relation by spacers 5 disposed between the plates and surrounding the securing means 6 which are arranged through the plate 2 and threaded into the plate 3. The frame or housing is of such dimensions as to be readily grasped and to enter the cylinders, being of substantial length so that the indicator and indicia end thereof project from the cylinder. The movable parts are mainly housed between the plates.

Adjacent the inner ends thereof the plates have opposed transversely disposed bead-like portions 7 struck out therefrom providing a transverse bore-like recess 8 between the plates. This recess is partially threaded as indicated at 9 to receive the screw wall-engaging or contact member 10. This member 10 has a head 11 peripherally knurled for effective grasping, the head having a convexly curved wall contacting surface 12. Screws 6' on either side of member 10 may be tightened to clamp the member in adjusted position.

Between the frame or housing plates I mount the feeler arm 14, the pivot 14' of this arm being located adjacent the recess 8 so that the outwardly curved short end of the feeler arm projects from between the plates. This projecting end is provided with a spherically curved knob or feeler 15 alined with the contact or thrust member 10 so that this contact member and the feeler member engage the walls of a cylinder at diametrically opposite points as is clearly shown in Fig. 1. The feeler 15 is intended to have movement imparted thereto by deviations or variations in the diameter and shape of the cylinder wall, it being under stood that the contact or thrust member 10 is first adjusted so that its curved face 12 has a touching or sliding engagement with the cylinder wall at the portion of its minimum diameter. This is usually toward the bottom of the cylinder or at the extreme top thereof beyond the stroke of the piston, as it is usually found that the point of greatest wear is in the zone at the upper end of the piston stroke. The long end of the feeler arm terminates in a curved joint member 16 engaging a corresponding socket 17 in the short end of the pointer 18 which is pivoted at 19.

The front plate at least is provided with a segmental slot or opening 20 through which the end of the pointer is visible, the plate being provided with scale or gauging indicia 21 operatively associated with the pointer. It will be noted that the relation of the feeler arm and pointer to their pivots is such that a relatively slight movement of the feeler 15 imparts a substantial movement to the indicating end of the pointer.

The feeler 15 is urged yieldingly outward and lost motion eliminated by means of the bowed spring 22 which is arranged between the housing plates with one end 23 engaging the inner end of the pointer and its other end 24 engaging the feeler arm. Its central or intermediate part is bowed at 25 to engage one of the spacing sleeves or frame plate attaching screws.

With this arrangement a simple form of spring serves not only to yieldingly project the feeler or urge it yieldingly outward, but also serves to apply actuating thrust to both the pointer and feeler arm, and, as stated, eliminates lost motion in the operating relation of these parts.

On the outside of the front plate I mount one or more manually adjustable indicating fingers, there being two in the embodiment illustrated, designated by the numerals 26 and 27. These are mounted on the pivot 19 and are preferably provided with offsets constituting finger pieces 29 which facilitate grasping or manipulation. The friction washer 30 is provided for maintaining them in their adjusted positions. These indicating fingers project into cooperating relation with the gauging scale or indicia 21 so that they may be independently manipulated or adjusted to the desired position.

In operation, after the contact member 10 has been adjusted to the diameter of the cylinder to be gauged, the gauge is inserted into the cylinder to the point from which it is desired to begin the taking of measurements and manipulated as by rocking as indicated until it is found that the center of oscillations has been reached, which indicates that the feeler and contact member are normal to the cylinder. One of the indicating fingers may then be manually adjusted to coincide with the position of the pointer or the gauge may be manipulated to ascertain the maximum and minimum diameters of the cylinder or of any zone thereof, and the indicating fingers adjusted to indicate the maximum and minimum variations of the gauge.

With this manipulation the customer can objectively see the variations in or out of round condition of the cylinder. It also helps the workman in determining these variations and in making repair records preparatory to grinding or reboring. While the scale calibrations are quite widely spaced to facilitate reading, the scale is actually calibrated in thousandths of an inch, that is, taking into consideration the magnifying of the movement of the pointer through the arrangement of parts described.

By thus arranging the parts I provide a taper or internal gauge which is not only extremely sensitive and accurate in operation, but is characterized by freedom from lost motion or other objectionable errors, so that great accuracy in manufacture of the parts is not essential to an accurate gauging action. This enables the economical production of the instrument; at the same time it is highly effective, and is accurate and easily manipulated or used by workmen of moderate skill. It is also possible to visually demonstrate to the customer the condition of the work.

I have illustrated and described my invention in an embodiment which I have found highly satisfactory. I have not attempted to illustrate or describe other adaptations of the invention which are possible as I believe the disclosure made will enable those skilled in the art to embody my invention as may be desired.

Having thus described my invention what I claim as new and desire to secure by Letters Patent is:

1. In an internal gauge, the combination of a frame comprising spaced plates having opposed transversely disposed bead-like struck-out portions adjacent one end thereof providing a transverse recess, a contact member threaded into said recess for adjustment and having a rounded work engaging head, a feeler arm pivotally mounted between said plates adjacent said recess and having a spherically curved work feeler projecting beyond the edges of said plates and alined with said contact member, a pointer pivoted between said plates and having a curved joint socket in its inner end, said feeler arm being provided with a curved joint portion engaging said socket, one of said plates being apertured adjacent the free end of said pointer to expose the same and calibrated to provide a scale for coaction therewith, and a spring acting to urge said feeler outwardly.

2. In an internal gauge, the combination of a frame comprising spaced plates having opposed transversely disposed bead-like struck-out portions adjacent one end thereof providing a transverse recess, a contact member threaded into said recess for adjustment and having a rounded work engaging head, a feeler arm pivotally mounted between said plates adjacent said recess and having a spherically curved work feeler projecting beyond the edges of said plates and alined with said contact member, a pointer pivoted between said plates and having a curved joint socket in its inner end, said feeler arm being provided with a curved joint portion engaging said socket, one of said plates being apertured adjacent the free end of said pointer to expose the same and calibrated to provide a scale for coaction therewith, and a bowed spring medially supported between said plates and having its ends engaging said feeler arm and indicating pointer whereby said arm and pointer are yieldingly urged for pivotal movement in opposite directions.

3. In an internal gauge, the combination of a frame comprising a pair of spaced plates having opposed transversely disposed bead-like struck-out portions adjacent one end thereof providing a transverse recess, a contact member threaded into said recess for adjustment, a feeler arm pivotally mounted between said plates adjacent said recess and having a work feeler projecting beyond the edges of said plates and alined with said contact member, a pointer pivoted between said plates and operatively associated with said arm, one of said plates being apertured adjacent the free end of said pointer to expose the same and calibrated to provide a scale for coaction therewith, and a spring means acting to urge said feeler outwardly.

4. In an internal gauge, the combination of a frame comprising a pair of spaced plates having opposed transversely disposed bead-like struck out portions adjacent one end thereof providing a transverse recess, a contact member threaded into said recess for adjustment, a feeler arm pivotally mounted between said plates adjacent said recess and having a work feeler projecting beyond the edges of said plates and alined with said contact member, a pointer pivoted between said plates and operatively associated with said arm, one of said plates being apertured adjacent the free end of said pointer to expose the same and calibrated to provide a scale for coaction therewith, and a bowed spring medially supported between said plates and having its ends engaging said feeler arm and indicating pointer whereby said arm and pointer are yieldingly urged for pivotal movement in opposite directions.

5. In an internal gauge for engine cylinders and the like, the combination of a pair of spaced parallel plates, a pointer pivotally mounted between said plates, one of said plates being calibrated adjacent an end thereof for coaction with said pointer, a feeler pivotally mounted between said plates with one end projecting outwardly therefrom for engagement with a cylinder wall, its other end being operatively associated with said pointer, spring means having the ends thereof engaging said feeler and pointer respectively, means supporting said spring means intermediate the ends thereof, and means cooperating with the cylinder engaging end of said arm to slidingly engage a cylinder wall on opposite sides thereof.

6. In an internal gauge for engine cylinders and the like, a frame, a calibration on said frame, a pointer pivotally mounted on said frame for movement with reference to said calibration, a feeler pivotally mounted on the frame, means operatively engaging said feeler with said pointer whereby movement of the feeler results in a proportionate movement of the pointer relative to the calibration, a bowed spring having the ends thereof engaging said pointer and feeler respectively to resist such movement in one direction thereof, and means on said frame for supporting the spring intermediate the ends thereof.

7. In an internal gauge for engine cylinders and the like, a frame, a calibration on said frame, a pointer pivotally mounted on said frame for movement with reference to said calibration, a feeler pivotally mounted on the frame, means operatively engaging said feeler with said pointer whereby movement of the feeler results in a proportionate movement of the pointer relative to the calibration, and a spring engaging said pointer and feeler respectively to resist such movement in one direction thereof.

HAROLD P. PHILLIPS.